(12) United States Patent
Liu et al.

(10) Patent No.: US 6,396,686 B1
(45) Date of Patent: May 28, 2002

(54) MOUNTING DEVICE FOR MOUNTING A DATA STORAGE DEVICE

(75) Inventors: Yu-Tai Liu, Hsin-Chuang; Yun-Long Chen, Chung-Ho; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/505,900

(22) Filed: Feb. 17, 2000

(30) Foreign Application Priority Data

Dec. 9, 1999 (TW) .......................................... 88220983

(51) Int. Cl.[7] .................................................. G06F 1/16
(52) U.S. Cl. ........................ 361/685; 361/683; 361/686; 361/724; 361/725; 361/726; 312/223.1; 312/223.2; 439/53; 439/152; 439/928.1; 248/27.3; 248/65; 248/73
(58) Field of Search ............................... 361/685, 683, 361/686, 724, 725, 726, 727; 312/223.1, 223.2, 222, 349; 248/27.1, 27.3, 535, 65, 534, 73; 439/53, 152, 157, 160, 928.1

(56) References Cited

U.S. PATENT DOCUMENTS

| | | | |
|---|---|---|---|
| 5,138,529 A | * | 8/1992 | Colton et al. ............... 361/816 |
| 5,262,923 A | * | 11/1993 | Batta et al. .................. 361/685 |
| 5,332,306 A | * | 7/1994 | Babb et al. ............. 312/334.16 |
| 5,340,340 A | * | 8/1994 | Hastings et al. .............. 439/64 |
| 5,683,159 A | * | 11/1997 | Johnson ................... 312/334.7 |
| 6,058,016 A | * | 5/2000 | Anderson et al. ........... 361/727 |
| 6,067,225 A | * | 5/2000 | Reznikov et al. ........... 361/685 |
| 6,158,699 A | * | 12/2000 | Boe .......................... 248/27.1 |
| 6,288,902 B1 | * | 9/2001 | Kim et al. .................. 361/725 |

\* cited by examiner

Primary Examiner—Darren Schuberg
Assistant Examiner—David Foster
(74) Attorney, Agent, or Firm—Wei Te Chung

(57) ABSTRACT

A mounting device for mounting a data storage device in a cage of a computer enclosure includes a board body and a plurality of fixing clips. The board body defines a plurality of mounting holes and receiving slots. Each fixing clip includes a inserting portion extending through the mounting hole of the board body and a corresponding side hole of the data storage device for attaching the board body to the data storage device, and first and second grounding fingers for respectively contacting the data storage device and the computer enclosure thereby forming a grounding path therebetween while fixing the data storage device to the computer enclosure.

18 Claims, 7 Drawing Sheets

MOUNTING DEVICE FOR MOUNTING A DATA STORAGE DEVICE

BACKGROUND OF THE INVENTION

1. Field of the Invention

The present invention relates to a mounting device for mounting a data storage device to a computer enclosure, and particularly to a mounting device having fixing clips for fixing the data storage device to the computer enclosure without screws and providing a grounding function.

2. The Related Art

Data storage devices used in a personal computer normally include a hard disk drive (HDD), a floppy disk drive (FDD) and a compact disc read only memory (CD-ROM) drive. A data storage device is often fixed in a receiving bracket of a computer enclosure by bolts. When mounting the data storage device to the computer enclosure, an assembler must align the data storage device with the receiving bracket with one hand and tighten the bolts with the other hand. This process is tedious and laborious. Therefore, rails are attached to both sides of the data storage device to simplify the installation process. However, conventional rails are often attached to the data storage device by screws. The time-consuming and cumbersome problem of tightening the screws is still not resolved.

Furthermore, conventional rails have a variety of special types each accommodating a special data storage device such as an FDD, an HDD or a CD-ROM drive due to different structure specifications. Unfortunately, each type of the rails requires to maintain an inventory of equipment and manufacturers must also develop manufacturing specifications, lines and routines to support and build each of these types.

On the other hand, a data storage device usually accumulates a quantity of static electricity. Rails made from conductive material, such as metal, promote discharging electrostatic charge on the data storage device. However, rails made of insulative material, such as plastic, hinder the electrostatic discharge process. An additional discharge path must be formed between the data storage device and the computer enclosure for grounding. Conventionally, the additional discharge path constitutes a spring member engaging between the data storage device and the computer enclosure. Such a spring member has fatigue problems leading to poor engagement between the data storage device and the computer enclosure.

Examples of conventional mounting devices are disclosed in U.S. Pat. Nos. 5,142,447, 5,262,923, 5,332,306 and 5,510,955 and Taiwan Patent Application Nos. 74208920, 75211318, 77203641, 79214337, 82202204 and 83208448.

The present invention overcomes the above disadvantages and problems by providing an improved mounting device for mounting a data storage device to a computer enclosure.

SUMMARY OF THE INVENTION

An object of the present invention is to provide a mounting device for conveniently mounting a data storage device to a computer enclosure without screws.

Another object of the present invention is to provide an adjustable mounting device for accommodating several data storage devices.

A further object of the present invention is to provide a mounting device for mounting a data storage device to a computer enclosure, comprising grounding fingers to form an effective grounding path.

In order to achieve the objects set forth, a mounting device for mounting a data storage device in a cage of a computer in accordance with the present invention includes a board body and a plurality of fixing clips. The board body defines a plurality of mounting holes and receiving slots. Each fixing clip comprises a inserting portion extending through the mounting hole of the board body and a corresponding side hole of the data storage device for attaching the board body to the data storage device, and first and second grounding fingers for respectively contacting the data storage device and the computer enclosure thereby forming a grounding path therebetween while fixing the data storage device to the computer enclosure.

These and additional objects, features and advantages of the present invention will become apparent after reading the following detailed description of the preferred embodiment of the invention taken in conjunction with the appended drawings.

DETAILED DESCRIPTION OF THE PREFERRED EMBODIMENT

Figure 1:
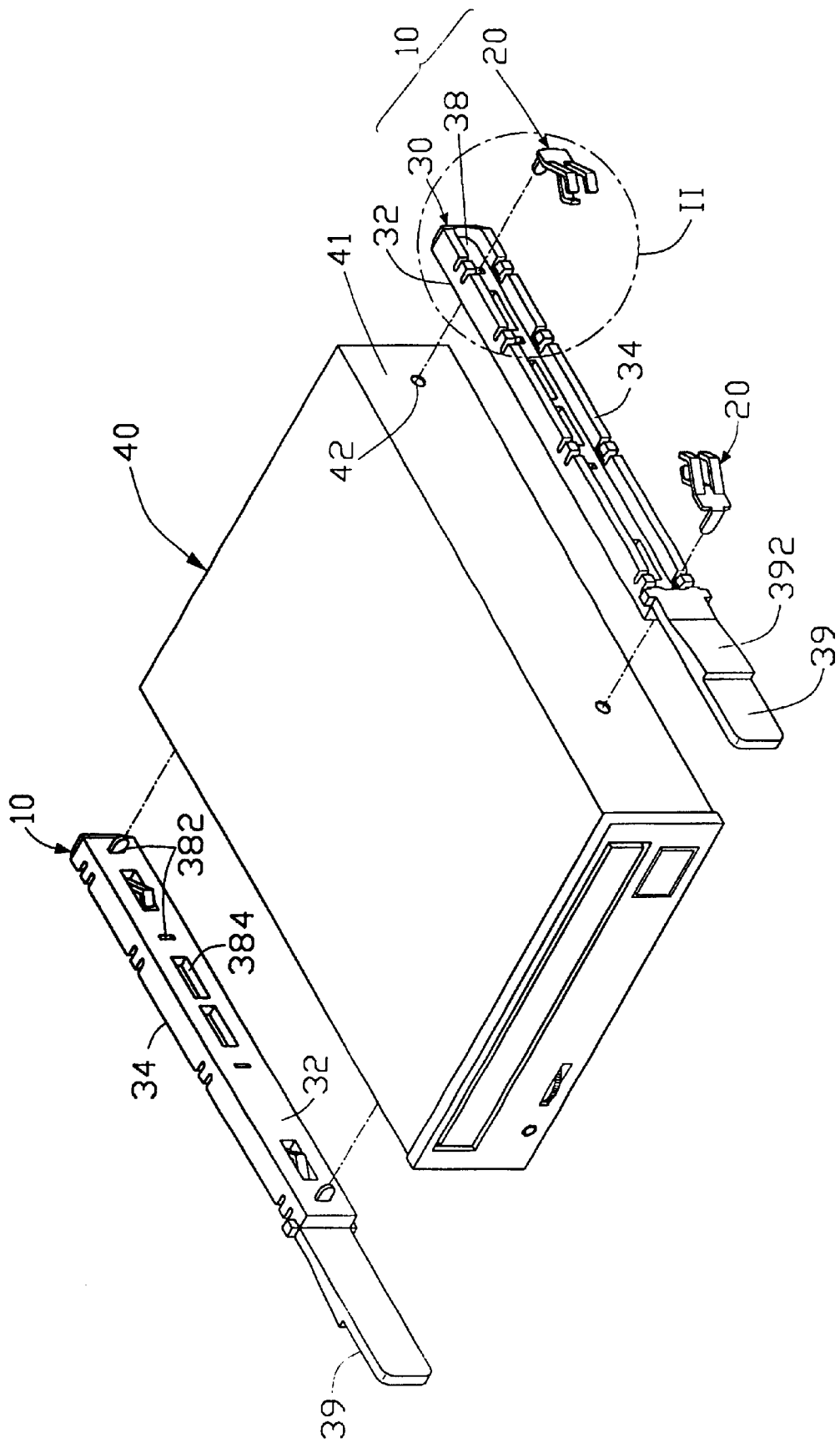
FIG. 1 is an exploded view of a mounting device in accordance with the present invention accommodating a first type data storage device.

Referring to FIGS. 1–5, a pair of mounting devices 10 in accordance with the present invention is attached to both sides of a first type data storage device, a CD-ROM drive 40 as an example, for mounting the CD-ROM drive 40 to a computer enclosure 50. Each mounting device 10 comprises a plurality of fixing clips 20 and a board body 30.

The board body 30 is a rectangular plastic board for abutting against one side of the CD-ROM drive 40. The board body 30 has a handle portion 39 at a front end, an inner side 32 for abutting against one side 41 of the CD-ROM drive 40, an outer side 34, and a generally U-shaped cross-section along its length. The U-shaped configuration of the board body 30 defines an upper and a lower flanges 36 and therein a longitudinally extending channel 38. A plurality pairs of mounting hole 382 and receiving slot 384 are provided through the inner side 32 to be in communication with the channel 38 for selectively providing locations for the fixing clips 20 to be mounted therein. Corresponding to each pair of the mounting hole 382 and the receiving slot 384 there are a pair of bars 362 formed by cut-out on the upper and the lower flanges 36 respectively. Each bar 362 has a tapered projected portion extending toward the other. The handle portion 39 further forms a tapered locking portion 392 on an outer surface thereof.

Figure 2:
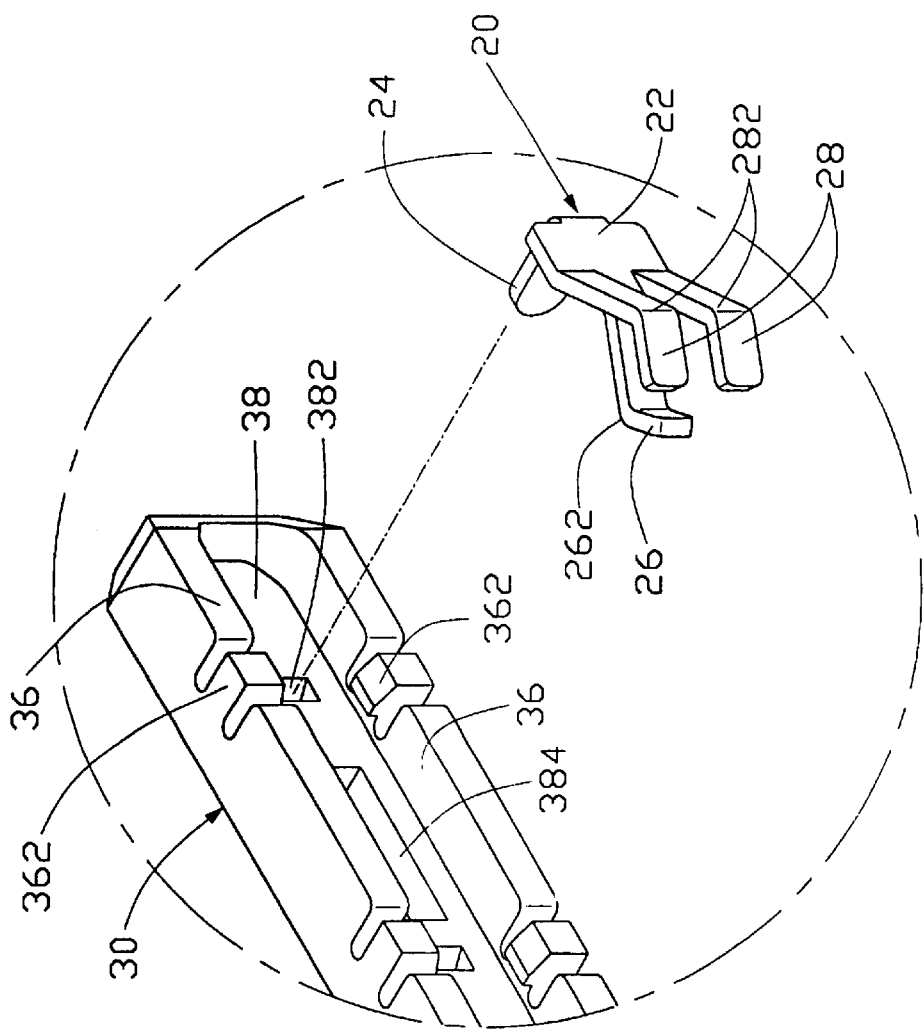
FIG. 2 is a partial, enlarged view of FIG. 1.
Figure 3:
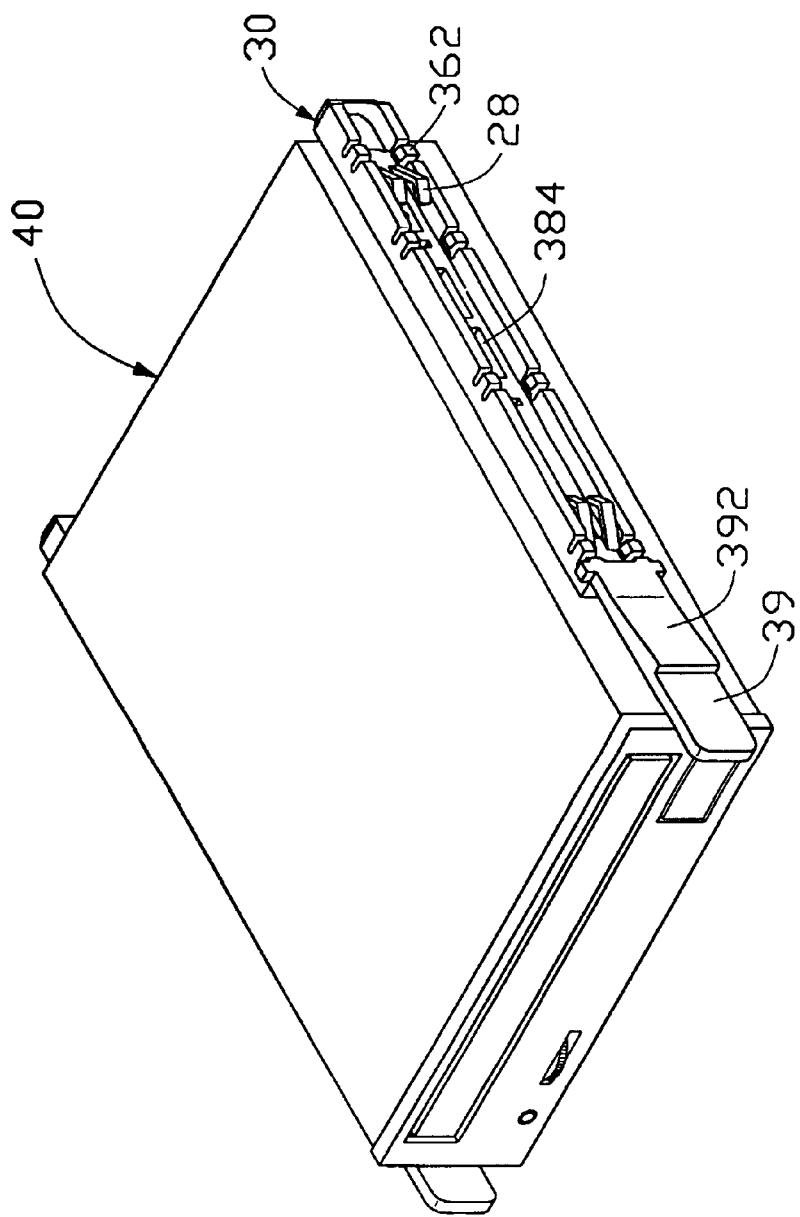
FIG. 3 is an assembled view of FIG. 1.

Each fixing clip 20 comprises a base 22, an inserting portion 24 perpendicularly extending from one end of the base 22, first and second grounding fingers 26, 28 extending from the other end of the base 22 (See FIG. 2). The first and the second grounding fingers 26, 28 are in forked shape and form convex arcs 262, 282 at free ends thereof. In assembly, the base 22 of the fixing clip 20 is received and retained in the channel 38 of the board body 30 by the bars 362 interferentially engaging an upper and a lower edges of the base 22 and the inserting portion 24 is inserted into the mounting hole 382 and extends beyond the inner side 32 of the board body 30. The first grounding finger 26 is received in the corresponding receiving slot 384 of the board body 30 while exposing its arc 262 beyond the inner side 32. The second grounding fingers 28 are in the channel 38 and the arcs 282 thereof extend outwardly beyond the outer side 34 (See FIG. 1). After the board body 30 and the fixing clips 20 are assembled together, the mounting device 10 is then attached to one side 41 of the CD-ROM drive 40 by inserting the inserting portions 24 through the mounting hole 382 and forward into corresponding side holes 42 defined in the CD-ROM 40 (See FIGS. 1 and 3). Here, the arc 262 of the first grounding finger 26 extends through the inner side 32 and contacts the side 41 of CD-ROM drive 40.

Figure 4:
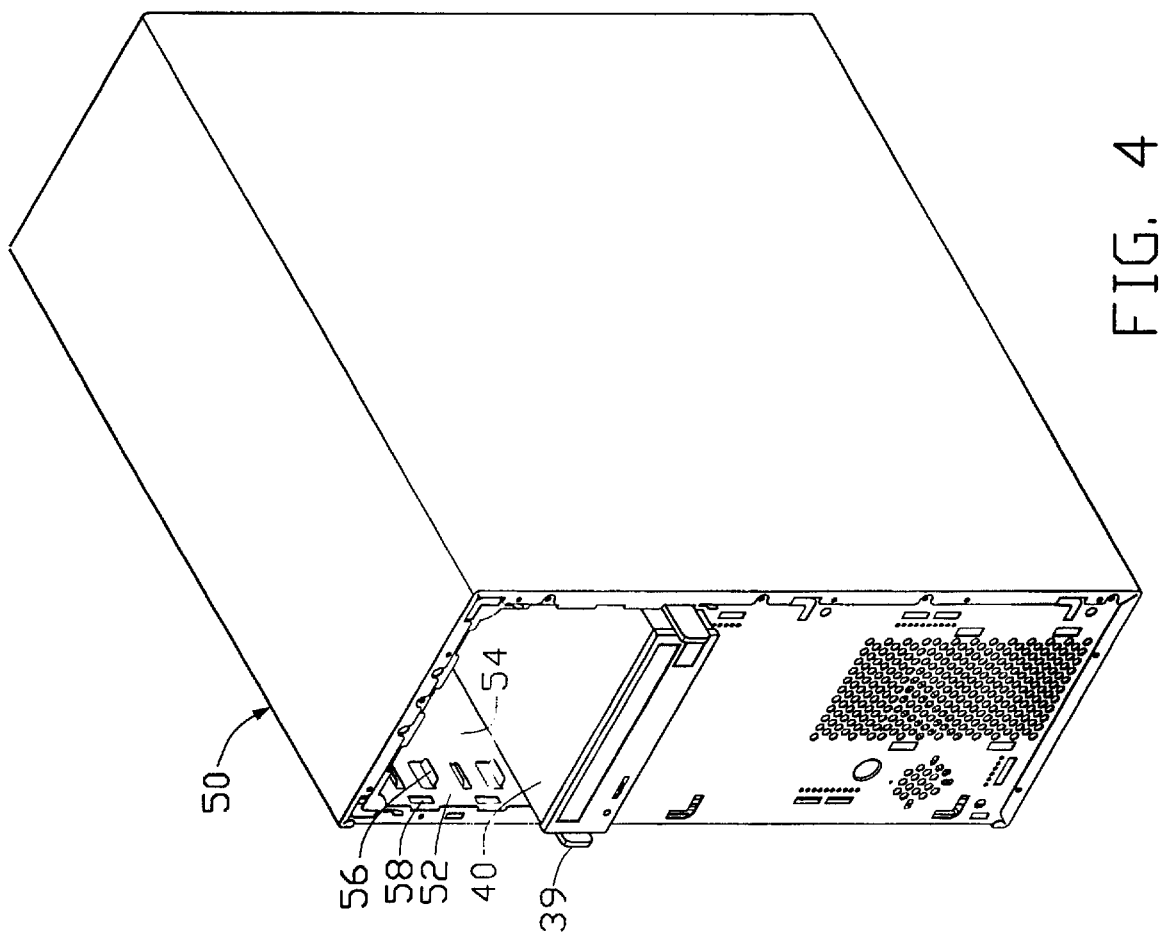
FIG. 4 is a perspective view showing the data storage device attached to a computer enclosure by the mounting device of FIG. 1.

FIG. 4 illustrates the mounting of the CD-ROM drive 40 to a cage 52 of the computer enclosure 50 by means of the mounting device 10. The CD-ROM drive 40 and the mounting device 10 are slid into the cage 52 by sliding the board body 30 of the mounting device 10 along corresponding opposite guide rails 56 formed in opposite inner walls 54 of the cage 52. The CD-ROM drive 40 together with the mounting devices 10 attached thereto are then retained between opposite guide rails 56 of the cage 52 with each locking portion 392 of the board body 30 being forcedly locked in a corresponding slot 58 defined in the cage 52. Here, the arcs 282 of the second grounding fingers 28 which extend beyond the outer side 34 of the board body 30 contacts the inner walls of the cage 52. The removal of the CD-ROM drive 40 together with the mounting device 10 from the cage 52 only needs a reverse operation by exerting opposite forces on the two handle portions 39 and releasing the locking portions 392 from the slots 5 pulling.

Figure 5:
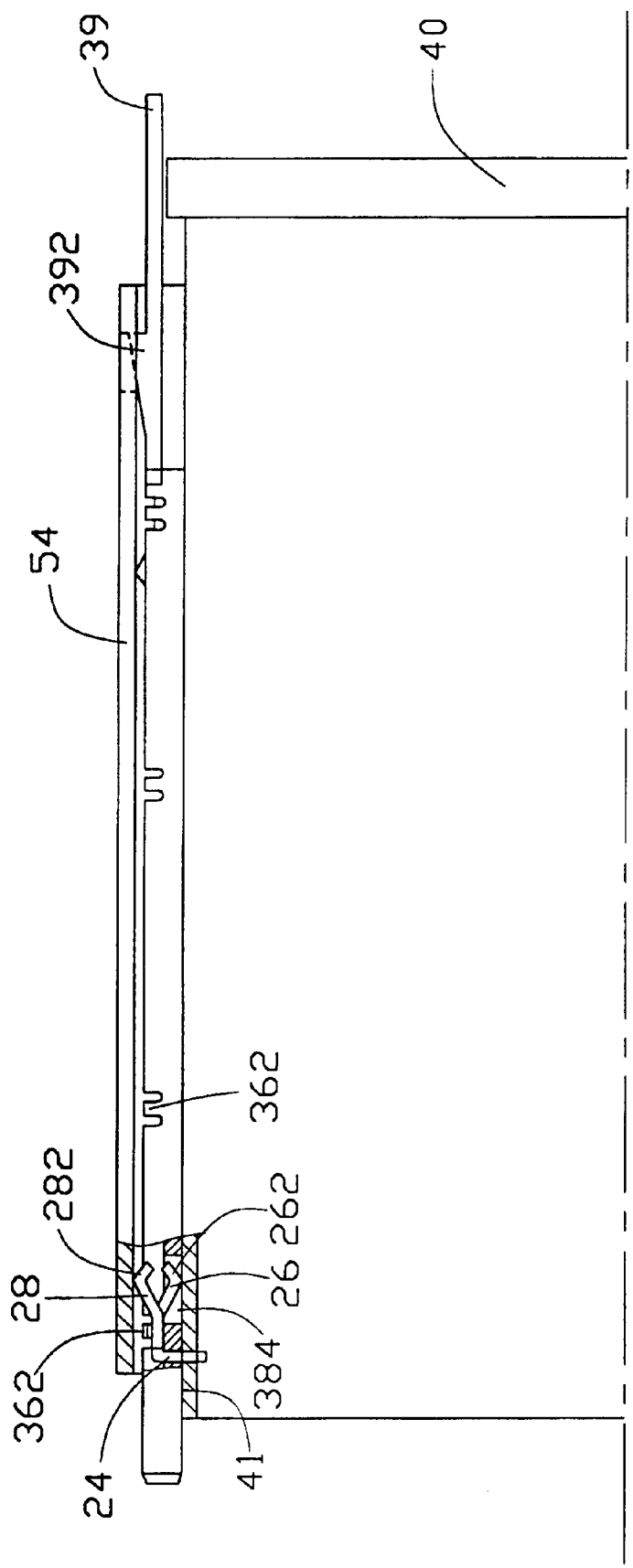
FIG. 5 is a partial, cross-sectional view of FIG.4.

Referring to FIG. 5, the arcs 262, 282 of the first and the second grounding fingers 26, 28 respectively contact the CD-ROM drive 40 and the computer enclosure 50 after the CD-ROM drive 40 is mounted in the computer enclosure 50 thereby forming a grounding path between the computer enclosure 50 and the CD-ROM drive 40 for electrostatic discharge purposes.

Figure 6:
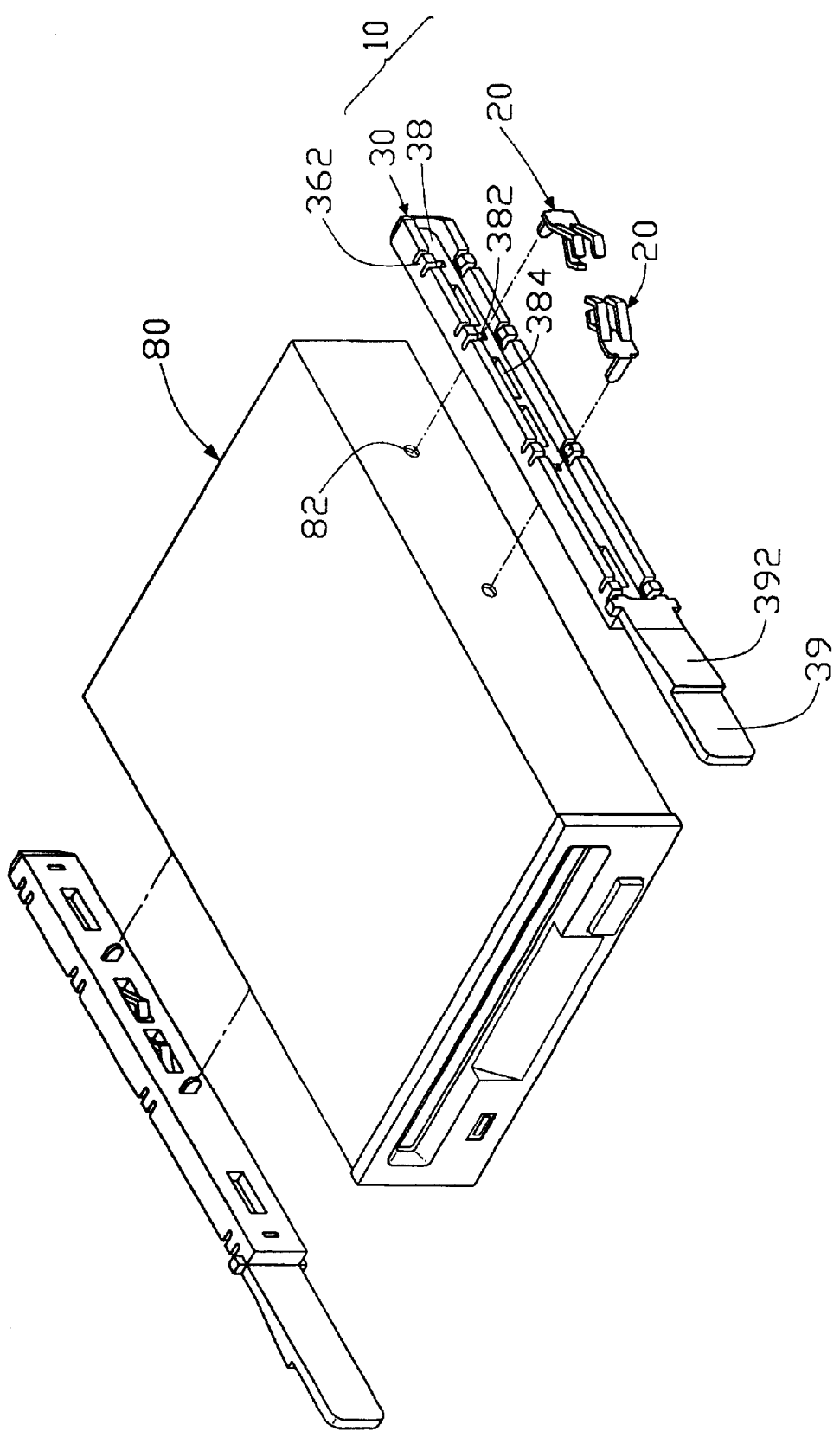
FIG. 6 is an exploded view showing the mounting device accommodating a second type data storage device.
Figure 7:
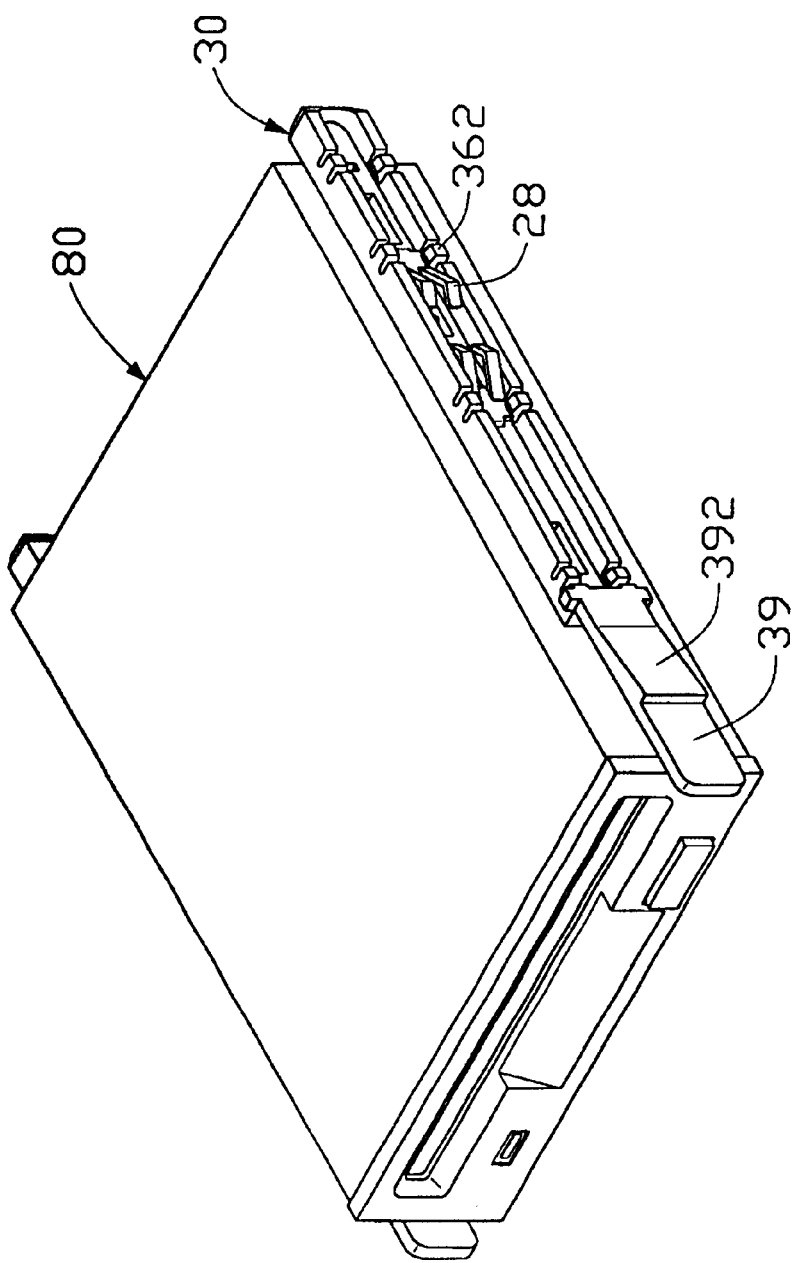
FIG. 7 is an assembled view of FIG. 6.

FIGS. 6 and 7 illustrate the mounting device 10 accommodating to a second type data storage device, for example an FDD 80. The fixing clips 20 are mounted in the selected pairs of mounting hole 382 and receiving slot 384 which correspond to side holes 82 of the FDD is formed in advance. A pair of mounting device 10 is then attached to opposite sides of the FDD 80 and mounts the FDD 80 to the computer enclosure as forgoing. Therefore, the mounting device 10 of the present invention is adjustable to accommodate several different special data storage devices.

While the present invention has been described in reference to a specific embodiment thereof, the description is illustrative and is not to be construed as limiting the invention. Various modifications to the present invention may be made to the preferred embodiment by those skilled in the art without departing from the true spirit and scope of the invention as defined by the appended claims.

We claim:

1. A mounting device adapted to mount a data storage device in a computer enclosure, comprising:
    a board body having an inner side for abutting against the data storage device and an outer side for engaging with the computer enclosure, at least one mounting hole and one receiving slot being defined in the board body; and
    at least one fixing clip having an inserting portion inserted into said mounting hole for mounting the board body to the data storage device, a first finger extending beyond the inner side of the board body through said receiving slot for contacting the data storage device, and a second finger extending beyond the outer side of the board body for contacting the computer enclosure thereby forming a grounding path between the data storage device and the computer enclosure.

2. The mounting device as claimed in claim 1, wherein the board body is a rectangular plastic board with a generally U-shaped cross-section along its length thereby defining therein a channel.

3. The mounting device as claimed in claim 2, wherein the board body further forms bars to engage with the fixing clip for retaining the fixing clip in the channel.

4. The mounting device as claimed in claim 1, wherein the board body has a handle portion at the front end.

5. The mounting device as claimed in claim 1, wherein the board body further forms a locking portion to engage with the computer enclosure.

6. The mounting device as claimed in claim 1, wherein the first and the second grounding fingers are in forked shape.

7. The mounting device as claimed in claim 6, wherein each grounding finger of the fixing clip forms a convex arc.

8. A mounting device adapted to mount at least two types of data storage device to a computer enclosure, comprising:
    a board body defining a plurality of mounting holes along its length, at least one of the mounting holes aligned with a side hole of the data storage device; and
    a corresponding number of fixing clips having inserting portions inserted into the aligned mounting holes and side holes for mounting the board body to one side of the data storage device, each fixing clip forming a first and a second grounding fingers for contacting the computer enclosure and the data storage device.

9. The mounting device as claimed in claim 8, wherein the board body has mounting holes respectively aligned with side holes of a CD-ROM, an FDD and an HDD to mount the CD-ROM, the FDD and the HDD to the computer enclosure respectively.

10. The mounting device as claimed in claim 8, wherein the board body is a rectangular plastic board with a generally U-shaped cross-section along its length thereby defining therein a channel.

11. The mounting device as claimed in claim 10, wherein the board body further forms bars to engage with the fixing clip for retaining the fixing clip in the channel.

12. The mounting device as claimed in claim 8, wherein the board body has a handle portion at the front end.

13. The mounting device as claimed in claim 8, wherein the board body further forms a locking portion to engage with the computer enclosure.

14. The mounting device as claimed in claim 8, wherein the board body further forms a receiving slot corresponding to each mounting hole to receive the first grounding finger.

15. The mounting device as claimed in claim 8, wherein the first and the second grounding fingers are in forked shape.

16. The mounting device as claimed in claim 15, wherein each grounding finger of the fixing clip forms a convex arc.

17. A method for mounting a data storage device to a cage of a computer enclosure, the steps comprising:
    providing two board bodies, each board body having a plurality pairs of mounting hole and receiving slot;

providing a plurality of fixing clips, each fixing clip comprising a base, an inserting portion perpendicularly extending from one end of the base, and forked first and second grounding fingers extending from the other end of the base;

providing a data storage device, the data storage device having side holes in opposite sides thereof;

selecting the mounting holes that align with the side holes of the data storage device to provide the fixing clips to be mounted therein;

inserting the inserting portions of the fixing clips into the selected mounting holes and extending the first grounding fingers through the corresponding receiving slots;

further inserting the inserting portions into the side holes of the data storage device for attaching the board bodies to opposite sides of the data storage device, thereby the first fingers contacting the data storage device;

sliding the data storage device with the board bodies into the cage of the computer enclosure, thereby the second grounding fingers contacting inner walls of the cage, and thereby forming grounding paths between the data storage device and the computer enclosure.

18. A data storage device assembly comprising:

a data storage device defines at least one side hole in each of two sides thereof;

a pair of identical mounting devices respectively mounted to said two sides of the data storage device, each mounting device including:

a board body defining a mounting hole in alignment with the corresponding side hole, and a receiving slot beside said mounting hole; and a clip defining an insertion portion extending through the mounting hole and interferentially received within the side hole for securing the board body to the corresponding side of the data storage device, a first grounding finger extending through the corresponding receiving slot and contacting the corresponding side of the data storage device, and a second grounding finger extending outwardly in a lateral direction for contacting an computer enclosure in which the data storage device is installed and grounded via said pair of mounting devices.

* * * * *